United States Patent
Knecht et al.

[11] Patent Number: 6,119,831
[45] Date of Patent: Sep. 19, 2000

[54] CONTROLLABLE VIBRATION DAMPER FOR MOTOR VEHICLES

[75] Inventors: Heinz Knecht; Norbert Ackermann, both of Eitorf, Germany

[73] Assignee: Mannesmann Sachs AG, Eitorf, Germany

[21] Appl. No.: 09/111,848

[22] Filed: Jul. 8, 1998

[30] Foreign Application Priority Data

Jul. 8, 1997 [DE] Germany ............... 197 29 146
May 19, 1998 [DE] Germany ............... 198 22 448

[51] Int. Cl.[7] ............... B60G 17/08; B60G 13/08; F16F 9/18
[52] U.S. Cl. ............... 188/282.2; 188/322.15; 188/322.13; 188/316; 188/282.8
[58] Field of Search ............... 188/282.2, 366.1, 188/316, 317, 322.15, 322.22, 318, 322.13, 266.2, 266.3–266.6, 282.1, 282.3, 282.4, 282.5, 282.6, 282.9, 285, 282.8, 322.2; 280/5.515; 701/37

[56] References Cited

U.S. PATENT DOCUMENTS

| 4,880,086 | 11/1989 | Knecht et al. ............... 188/322.2 |
|---|---|---|
| 5,078,240 | 1/1992 | Ackermann et al. ............... 188/282.2 |
| 5,301,776 | 4/1994 | Beck ............... 188/322.2 |

FOREIGN PATENT DOCUMENTS

| 37 19 113 | 8/1988 | Germany ............... F16F 15/04 |
|---|---|---|
| 44 18 972 | 12/1995 | Germany ............... B60G 17/08 |

*Primary Examiner*—Douglas C. Butler
*Attorney, Agent, or Firm*—Cohen, Pontani, Lieberman & Pavane

[57] ABSTRACT

A controllable vibration damper for motor vehicles, having a cylinder containing damping fluid, a piston rod entering the cylinder in a sealed manner and arranged axially displaceably therein, and a damping piston which is fastened to the piston rod and divides the cylinder into two working spaces, as well as a damping valve, which is provided with a valve seat and controls the effective cross section of a damping passage of the main stage via an axially displaceable valve body, the valve body being acted on in one direction by a precontrolling device and activated directly in the opposite direction.

16 Claims, 3 Drawing Sheets

CONTROLLABLE VIBRATION DAMPER FOR MOTOR VEHICLES

BACKGROUND OF THE INVENTION

1. Field of the Invention

The invention relates to a controllable vibration damper for motor vehicles. More specifically, the present invention relates to a controllable vibration damper having a cylinder containing a damping fluid, a piston rod axially displaceably arranged in the cylinder in a sealed manner, and a damping piston fastened to the piston rod and dividing the cylinder into two working spaces. The vibration damper also has a damping valve provided with a valve seat which controls the effective cross section of a damping passage of the main stage via an axially displaceable valve body.

2. Description of the Related Art

Prior art vibration dampers, such as, for example, those disclosed in German reference DE-A 38 00 865, include a piston in which the entire quantity of damping fluid exchanged between two working spaces flows via a restricting cross section, the size of which is determined by an electromagnetic setting device primarily comprising a solenoid and an armature. The piston is in this case subjected to flow from two sides, without nonreturn valves being provided. This prior art device is a directly controlled piston valve in the piston of a vibration damper. A problem with this prior art design is that the spring forces and magnetic forces required to overcome the flow forces of the damping fluid and to stabilize the system have to be very high.

Other prior art vibration dampers are also known, for example, from reference WO/85/04698, in which a precontrolled damping valve in the piston of the vibration damper is provided with four nonreturn valves. In these prior art vibration dampers, flow is directed through the precontrolled damping valve in only one direction. That is to say, the nonreturn valves must make the entire oil flow unidirectional. Establishing a unidirectional flow of the oil relates in this case to the main stage. A problem with these prior art designs is that either large nonreturn valves are required, which cannot be structurally accommodated very well in the vibration damper, or the extent to which the pressure can be lowered when there are high volumetric flows through the precontrolled damping valve is restricted.

Yet another type of prior art vibration dampers are known, for example, from references DE-A 44 18 972 and EP-A 0,364,757, in which a valve body of a damping valve subjected to flow from alternate sides in the vibration damper is controlled by a precontrolling stage. The damping valve is in this case subjected to flow from alternate sides in the main stage, while the valve body is subjected to unidirectional flow in the compression and rebound stages to establish a unidirectional flow of the precontrolling stage. This prior art structure requires four nonreturn valves, which establish the corresponding unidirectional flow in the precontrolling stage. A problem with this prior art device is that, due to the number of corresponding nonreturn valves, a considerable constructional expenditure is required and the response and timing of the control of the damping valve of the vibration damper are compromised.

Yet another prior art vibration damper disclosed in reference DE 37 19 113 C1 which includes a controllable shock absorber which has an infinitely adjustable damping valve. To reduce the controlling energy, the damping valve is provided with a precontrolling means in which the valve body used has a restricting bore extending from an end face to which pressure is applied to a rear side which is controlled by an axially constantly displaceable control needle.

SUMMARY OF THE INVENTION

The object of the invention is to provide a controllable vibration damper which has an infinitely variable, quickly and precisely operating control means, which can be designed as a single-tube vibration damper and as a twin-tube vibration damper and can be produced at low cost with little expenditure in terms of production engineering. The vibration damper according to the invention meets all requirements with respect to response and timing and the amount of (electrical) energy required for its control remains low.

To achieve this object, it is provided according to an embodiment of the invention that the valve body is acted on in one direction by a precontrolling means. An axially movable valve element is arranged for positioning the valve body in this direction which applies pressure to the valve on its rear side from one of two working spaces via a flow connection having a prerestricting means. The valve body is activated in the other direction directly, with the valve body being acted on by the pressure of the damping fluid of the other of the two working spaces.

This embodiment has the advantage that it is possible to dispense with the use of nonreturn valves, without the problem in the prior art of having inadmissibly high driving forces in the operating direction with high damping forces.

According to one feature, a precontrolling means is effective when the vibration damper is in the rebound stage and the valve body is activated directly when the vibration damper is in the compression stage.

According to a further embodiment, a valve element is axially movably arranged on the rear side of the valve body for positioning the valve body in the rebound stage. Pressure can be applied to the valve element from one of the two working spaces via a flow connection having a prerestricting means.

According to a preferred embodiment, an actuator chamber assigned to the valve element is connected to one of the working spaces via a passage.

According to another feature, it is provided that the valve body is acted on in the rebound direction by an annular face in one direction and by a further annular face in the opposite direction.

A further embodiment provides that the valve body and the valve element are connected to a second valve element. In this case, the second valve element has a valve seat for the valve body and has on the side opposite the valve seat a cone which interacts with a valve seat of an additional valve body. The cone has on the end face opposite the cone a control edge which interacts with the valve body.

According to another preferred embodiment, it is provided that the cone on the valve ensures there is a difference between the faces to which pressure is applied, so that the different diameters of the control edge and the valve seat have different pressure-application faces in the compression and rebound stages.

A further embodiment provides that the valve body has an additional valve connected parallel to it in one direction. This additional valve serves for varying the force profile in the compression and rebound stages. It blocks in one direction of through flow, and releases through flow in the other direction. In a preferred embodiment, the additional valve is assigned a constant restricting cross section. In addition, the additional valve and the restricting cross section may be arranged within the valve body.

A further embodiment provides that the valve body is accommodated in an axially movable manner in an actuator chamber with the upper region of the actuator chamber connected to one of the working spaces via a flow connection. It is advantageous here that the drive element can be throttled, by, for example, a cross-sectional constriction as a restricting means in the flow connection.

In a preferred embodiment, a restricting means is arranged between the lower region and the upper region of the actuator chamber.

According to a further feature, it is provided that the axially movable valve element is acted on by a drive element. It is advantageous here that a flexible part is arranged between the valve element and the drive element and/or that, for cardanic mobility, between the valve element and the drive element there is arranged a component, the supporting face of which allows mobility with respect to the bearing face of the valve element.

A further variation of the damping force characteristics is achieved by the valve body being preceded in the direction of direct activation by an additional valve.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
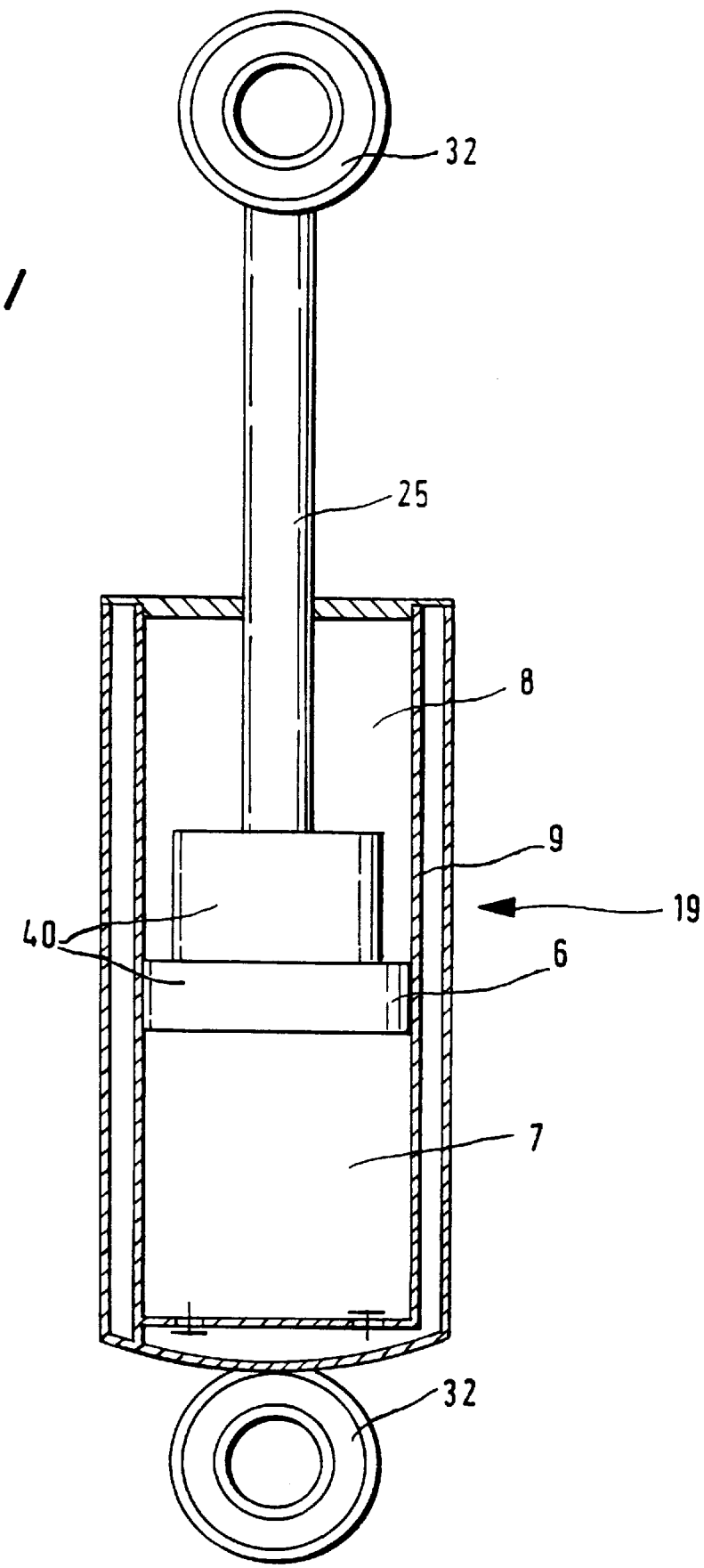
FIG. 1 is a general longitudinal sectional view of a vibration damper according to an embodiment of the invention.

Referring to FIG. 1, a vibration damper 19 according to an embodiment of the present invention comprises a cylinder 9, a damping piston 6 and a piston rod 25. The damping piston 6 divides the working cylinder 9 into a lower working space 7 and an upper working space 8. The damping piston 6 includes a damping valve 40, which is represented in detail in FIGS. 2 to 4. Fastening elements 32 are used for fastening the vibration damper 19 to a chassis or body of the vehicle.

Figure 2:
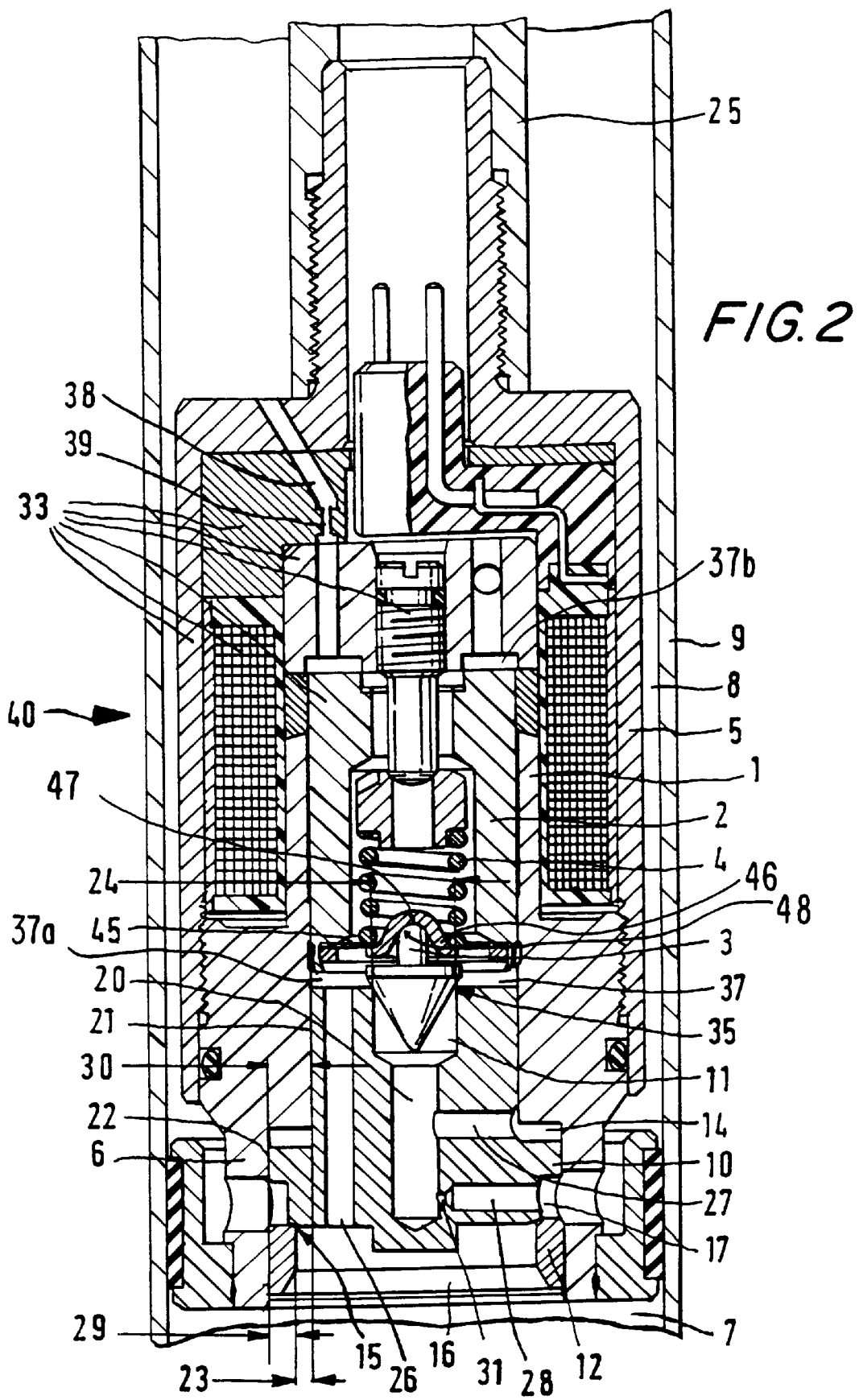
FIG. 2 is a detailed sectional view of a damping piston the vibration damper in FIG. 1.

Referring now to FIG. 2, the damping valve 40 includes a housing 5 arranged between the damping piston 6 and the piston rod 25. An actuator 33, a valve housing 1, a drive element 2, and also a valve body 10 are accommodated in the housing 5. The drive element 2, together with a valve element 3 and a spring element 4, forms a precontrolling means with respect to the valve body 10. For this purpose, the valve body 10 is designed with respect to the valve element 3 with a valve seat 35. The valve seat 35 separates an actuator chamber 37 from a restricting passage 11 or a prechamber 20.

The valve body 10 has a control edge 15 with respect to the lower working space 7 on which the main flow of the damping medium between the working spaces 7 and 8 flows. The valve body 10 is activated directly by the lower working space 7, with the assistance of the bottom chamber 16. Consequently, for the damping valve 40 this produces precontrol by the valve element 3 in the rebound stage and direct activation of the valve body 10 from the lower working space 7 in the compression stage.

Accordingly, in the compression direction, the damping valve 40 operates as a directly controlled valve, in that the valve body 10 is displaced against the spring element 4 by pressure of the damping fluid on an annular face 23. In this case, the valve element 3 acts as a nonreturn valve, since it is supplied with damping medium from a passage 26 and blocks a restricting passage 11 or passage 28 for the outflowing damping medium, while the preloading of the spring element 4 is controlled via the actuator 33.

In the rebound direction, the damping valve 40 operates as a precontrol valve, in that the valve element 3 is acted on by the damping medium flowing onto it through the passage 28 and the restricting passage 11. The pressure produced in the prechamber 20 is passed on to the control chamber 14 via the passage 27, so that the valve body 10 is kept in equilibrium, in that the damping pressure acts on the annular face 29 and, opposing this, the control pressure acts on the annular face 30 and the pressure-application face 24. In this case, the opening stroke of the valve body 10 is determined by the control pressure on the valve element 3 against the spring 4, the preloading of which is changeable by the actuator 33.

The drive element 2 is axially displaceably arranged in the actuator chamber 37, the rearward region of the drive element 2 with respect to the valve element 3 being arranged in the upper region 37b of the actuator chamber 37 and the valve element 3 being arranged in a lower region 37a. The upper region 37b of the actuator chamber 37 has a flow connection 38 which connects the actuation chamber 37b to the upper working space 8 of the cylinder 9. When the drive element 2 moves axially, the damping medium passes without pressure into the upper working space 8. To achieve a corresponding damping of the drive element 2, a cross-sectional constriction 39 is additionally introduced into the flow connection 38, so that the damping medium flows away in a restricted manner and the axial movements of the drive element 2 are correspondingly damped.

The valve element 3 may be movably disposed so that a cardanic or angular freedom of movement of valve element 3 with respect to the drive element 2 is enabled. The cardanic or angular freedom of movement may be achieved, for example, in that a supporting face 47 of component 46 forms together with a bearing face 48 of the valve element 3 a cardanically movable connection. An additionally flexible connection is possible if a flexible part 45 is arranged at the connection between the drive element and the valve element.

FIG. 2 additionally shows that the passage 28 has a constricted inflow passage 31. Furthermore, the side of passage 28 facing the valve housing 1 opens into an annular chamber 17, which in this case forms a valve seat 12. The valve body 10 is guided with respect to the damping piston 6 by an inner sealing diameter 21 and an outer sealing diameter 22.

Figures 3, 4:
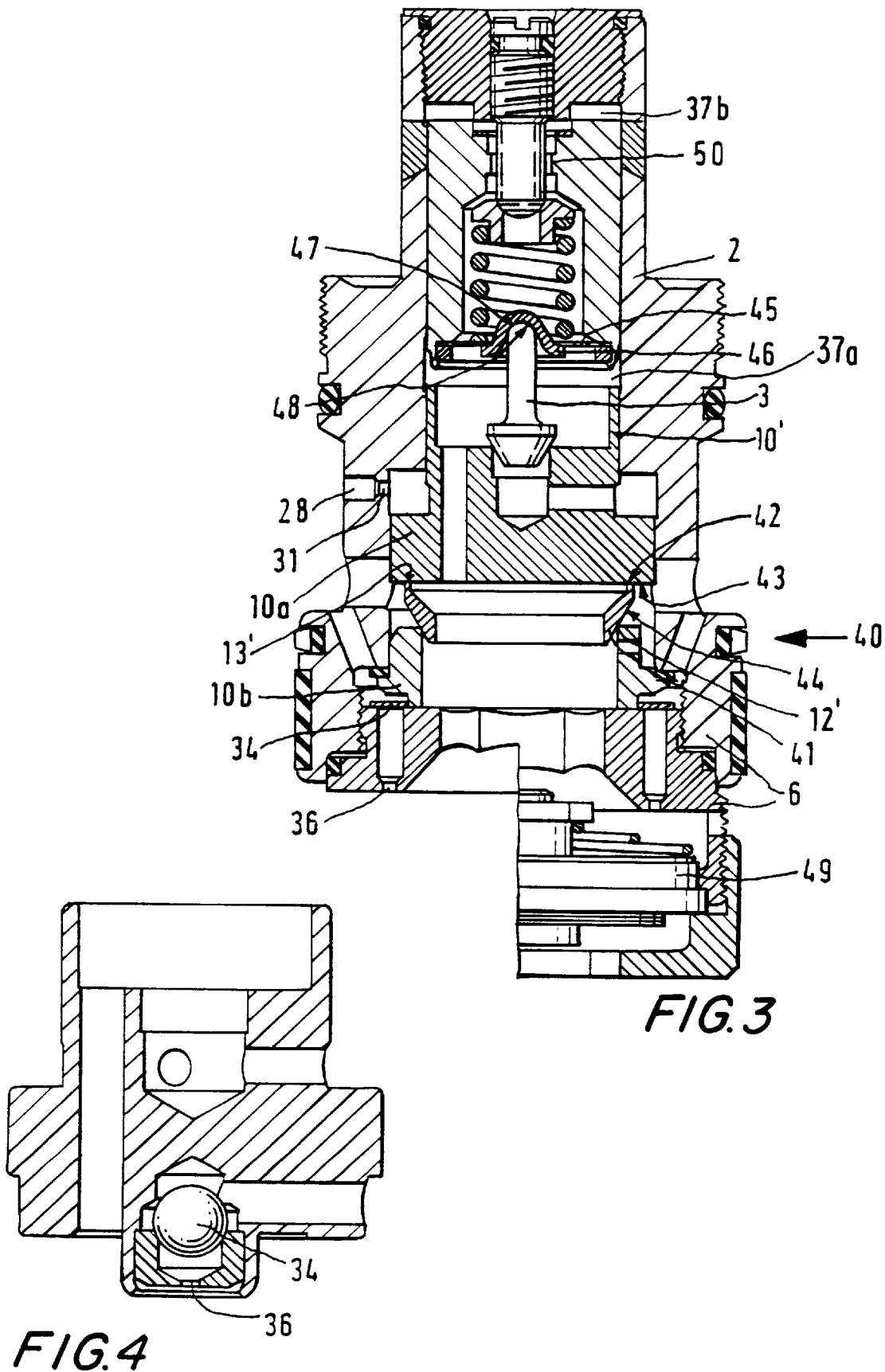
FIG. 3 is a partial sectional view of another embodiment of the damping piston shown in FIG. 2, including an additional valve.
FIG. 4 shows a valve body as a detail corresponding to the damping valve in FIG. 2.

FIG. 3 shows an embodiment of a damping piston 6 in which the damping valve 40 comprises an additional valve element 41. In this embodiment, the valve body 10' is divided into two parts, an upper valve body 10a and a lower valve body 10b, and has two individual valve seats 12' and 13'.

In the compression stage, the additional valve element 41 according to FIG. 3 is brought to bear against the valve seat 12' by the pressure of the damping medium, while the valve body 10' is displaced toward the opening direction. The cross section required for restricting the damping medium is released between a control edge 42 and an end face 43 of the valve body 10'.

In the rebound stage, the valve element 41 experiences a pressing force in the direction of the upper valve body 10a, so that the cross section required for restricting the damping medium is released between the cone of the additional valve element 41 and the valve seat 12'. By the use of the additional valve element 41 it is accordingly possible to make both the pressure-application faces and the restricting cross sections for the compression and rebound stages independent and, as a result, further improve the possibilities for obtaining the desired characteristics in the compression and rebound stages of the damper.

FIG. 3 also shows an additional valve 34 arranged parallel to the resistance of the damping valve 40. The fixed restricting resistance of valve 34 can be set so that consequently fine tuning of the profile of the overall damping force can be performed in a particular way. The additional valve 34 may be assigned a constant restricting cross section 36, which interacts with the additional valve 34 acting as a nonreturn valve. The restricting cross section 36 permits an independent setting of the force introduced in the compression and rebound stages. Also shown in FIG. 3 is an optional restricting cross section 50 between the upper region 37b of the actuator chamber 37 and the lower region 37a of the actuator chamber 37.

In FIG. 4, yet a further embodiment according to the invention shows that the additional valve 34 and the restricting cross section 36 are provided as a compact structural unit. The elements can be arranged within the valve body 10 without any problem.

The invention is not limited by the embodiments described above which are presented as examples only but can be modified in various ways within the scope of protection defined by the appended patent claims.

What is claimed is:

1. A controllable vibration damper for motor vehicles, comprising:
    a cylinder having two ends and containing a damping fluid;
    a piston rod sealingly entering said cylinder through one of said two ends and axially movable with respect to said cylinder;
    a damping piston connected to an end of said piston rod and dividing said cylinder into first and second working spaces;
    a damping valve mounted in said damping piston having an axially displaceable valve body and a valve housing having a first valve seat;
    a damping passage passing through said damping valve;
    a precontrolling means arranged in an actuation chamber in said valve housing and comprising an axially movable first valve element mounted within said valve housing, a drive element axially displaceably arranged in said valve housing, a spring element arranged between said first valve body and said drive element for urging said first valve element against a second valve seat arranged on said valve body, and an actuator for axially displacing said drive element, said first valve element communicating with said second working space through a first passage having a prerestricting element so that said first valve element applies a pressure to said spring element in response to a pressure in said second working space, said valve body comprising a second passage connecting said actuation chamber and said first working space, wherein a cross-section of an area between said first valve element and said second valve seat controls a flow of said damping fluid through said damping passage when said vibration damper is acted on in a first direction; and
    said valve body directly axially displaceable by a pressure in said first working space when said vibration damper is acted on in a second direction for controlling a flow of said damping fluid through said damping passage when said vibration damper is acted on in said second direction.

2. The vibration damper of claim 1, wherein said first direction corresponds to a rebound stage of said vibration damper.

3. The vibration damper of claim 1, wherein second direction corresponds to a compression stage of said vibration damper.

4. The vibration damper of claim 3, wherein said valve body comprises first and second annular faces and said valve body is acted on via said first annular face when said vibration damper is acted on in said first direction and via said second annular face when said vibration damper is acted on in said second direction.

5. The vibration damper of claim 1, wherein said damping valve comprises a second valve element.

6. The vibration damper of claim 5, further comprising an additional valve body, wherein a third valve seat is arranged on said additional valve body and said second valve element comprises a cone section on a side of said second valve element opposite said first valve seat, said cone section interacting with said third valve seat of said additional valve body.

7. The vibration damper of claim 6, wherein said cone section comprises a control edge on an end face opposite said first valve seat, said control edge interacting with said valve body.

8. The vibration damper of claim 7, wherein said cone section on said second valve element is operatively shaped so that said control edge and said first valve seat have different diameters thereby ensuring different pressure-application faces for said first direction and second direction of vibration damper activation.

9. The vibration damper of claim 1, wherein said valve body comprises an additional valve arranged parallel to said damping valve and active in said first direction.

10. The vibration damper of claim 9, wherein said additional valve comprises a constant restricting cross section.

11. The vibration damper of claim 10, wherein said additional valve and said restricting cross section are arranged within said valve body.

12. The vibration damper of claim 11, wherein said restricting means of said second flow connection comprises a cross-sectional constriction.

13. The vibration damper of claim 1, wherein said actuation chamber comprises an upper region connected to said second working space via a third passage.

14. The vibration damper of claim 1, wherein said actuation chamber comprises an upper region and a lower region and said vibration damper further comprises a restricting means arranged between said lower region and said upper region of said actuator chamber.

15. The vibration damper of claim 1, further comprising a component having a supporting face and said valve element comprising a bearing face interacting with said supporting face for allowing cardanic mobility between said first valve element and said drive element.

16. The vibration damper of claim 1, further comprising an additional valve which precedes said valve body in said second direction of direct activation.

* * * * *